Figure 1:
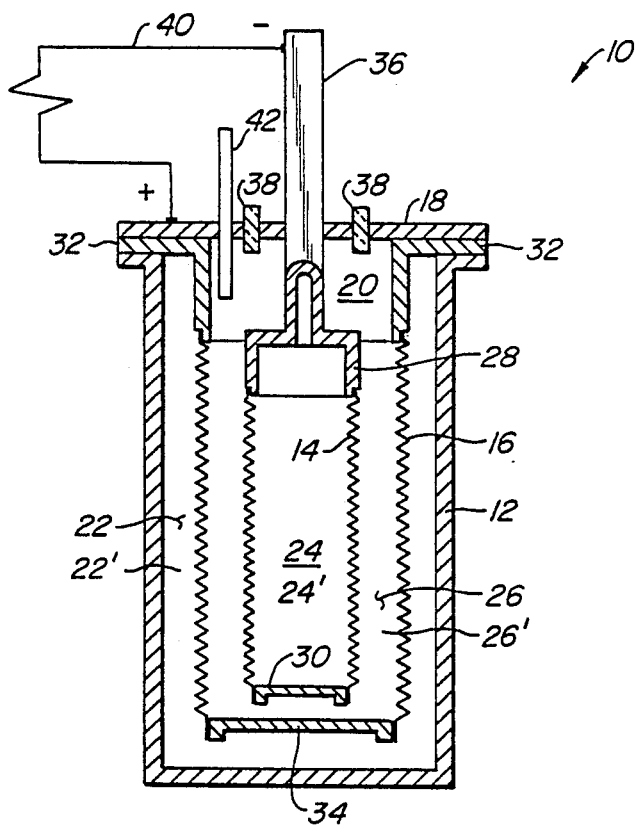

United States Patent [19]

Roy

[11] Patent Number: 4,833,046
[45] Date of Patent: May 23, 1989

[54] METAL-HYDROGEN SECONDARY BATTERY

[75] Inventor: Prodyot Roy, Saratoga, Calif.

[73] Assignee: General Electric Company, San Jose, Calif.

[21] Appl. No.: 125,624

[22] Filed: Nov. 25, 1987

Related U.S. Application Data

[63] Continuation of Ser. No. 909,374, Sep. 19, 1986, abandoned.

[51] Int. Cl.[4] ............................................. H01M 10/39
[52] U.S. Cl. ........................................ 429/50; 429/20;
429/103; 429/112; 429/199; 429/16
[58] Field of Search ............................... 429/101-103,
429/112, 16, 17, 20, 50, 51, 52, 199, 200, 120

[56] References Cited

U.S. PATENT DOCUMENTS

| | | | |
|---|---|---|---|
| 3,014,084 | 12/1961 | Ciarlariello | 429/17 |
| 3,031,518 | 4/1962 | Werner et al. | 429/16 |
| 3,119,723 | 1/1964 | Crouthamel et al. | 429/17 |
| 3,245,836 | 4/1966 | Agruss | 429/17 |
| 3,338,749 | 8/1967 | Johnson et al. | 429/13 |
| 3,345,214 | 10/1967 | Zauner et al. | 429/112 |
| 3,404,035 | 10/1968 | Kummer et al. | 429/104 X |
| 3,809,578 | 5/1974 | Symons | 429/51 |
| 3,817,791 | 6/1974 | Greatbatch et al. | 429/101 |
| 3,849,200 | 11/1974 | Charles et al. | 429/104 |
| 3,935,024 | 1/1976 | Symons | 429/17 |
| 3,946,751 | 3/1976 | Breiter et al. | 429/166 |
| 3,960,596 | 6/1976 | Mitoff et al. | 429/185 |
| 3,993,502 | 11/1976 | Bjorkman, Jr. | 429/51 |
| 4,049,877 | 9/1977 | Saillant et al. | 429/11 |
| 4,065,604 | 12/1977 | Zellhoefer | 429/103 |
| 4,123,597 | 10/1978 | Zauner et al. | 429/112 |
| 4,156,758 | 5/1979 | Vissers et al. | 429/112 |
| 4,178,418 | 12/1979 | Croset et al. | 429/27 |
| 4,692,390 | 9/1987 | Roy | 429/17 |

OTHER PUBLICATIONS

Linden, D., "Handbook of Batteries & Fuel Cells," pp. 31-10, 31-12, 32-26, 1984.

Brogstedt, H., "Material Behavior & Physical Chemistry in Liquid Metal Systems" pp. 297-307, 1982.

Primary Examiner—Anthony Skapars
Attorney, Agent, or Firm—Raymond E. Smiley

[57] ABSTRACT

A secondary electrochemical cell includes a source of hydrogen as the hydrogen-providing reactant and an alkali or alkaline earth metal as the metal reactant. Hydrogen may be from $H_2$ gas or a metal hydride. By separating the two reactants by a barrier selective for the passage of hydrogen ions, current flow may be induced in an external circuit connected across the barrier. The barrier is typically an electrolytic salt enclosed between a pair of solid metal electrodes. Electrons are gained by the hydrogen as it enters the electrolyte and lost by the hydrogen as it leaves the electrolyte. By connecting the metal electrodes, a circuit is established.

27 Claims, 2 Drawing Sheets

METAL-HYDROGEN SECONDARY BATTERY

This is a continuation-in-part of U.S. patent application Ser. No. 909,374, now abandoned, entitled "Metal Hydride Storage Battery" (now abandoned).

The present invention relates generally to the construction of secondary batteries, usually referred to as storage batteries. More particularly, the present invention relates to batteries employing ion-selective barriers, where current flow is established by passing an ionizable species through the membrane under an electrochemical potential.

Secondary batteries employ highly reversible electrochemical reactions which allow them to be recharged many times. During the discharge phase, the battery supplies current as a result of a difference in electrochemical potential which drives electrons through a load. Electrons are produced at the anode, where oxidation occurs, and pass through the load to a cathode, where reduction takes place. As reacting species are consumed, the voltage and current will diminish, and at a certain point it is necessary to recharge the battery. Recharging is accomplished by applying an external power source across the terminals of the battery to reverse the electrochemical reaction. During recharging, the anode becomes a cathode and the cathode becomes the anode.

Secondary batteries are used in a wide variety of applications where there is a need to store energy. The most visible application is probably in automobiles where a storage battery is used to run the starter, lights, and instrumentation. Other uses of particular importance to the present invention include use as a power source in electrically-driven vehicles, use as a peak energy source in stationary power plants, and use as a power source in spacecraft.

The utility and effectiveness of a storage battery may be measured by a number of criteria. Specific energy (sometimes referred to as energy density), which refers to the total energy available from the battery per unit weight, is a particularly impotant criterion for batteries used in vehicles and spacecraft where minimization of weight is important. Power density and specific power refer to the ability to supply a large current over a short time period, and is inversely related to the internal resistance of the battery. High power density and specific power are particularly important criterion for batteries used for providing peak energy in stationary power plants and special space applications. Other characteristics of concern when designing batteries include sturdiness and safety. Fragile batteries can fail under adverse conditions, and in some cases expose users to battery acids and other chemicals which may be dangerous.

Sodium-sulfur and lithium-iron and sulfide batteries having relatively high specific energy and power have been developed. The electrolytes used for these two high temperature batteries are beta-alumina ceramic (sodium-sulfur) and porous MgO ceramic (lithium-iron sulfide) impregnated with liquid chloride electrolytes (lithium/FeS$_2$). Although these batteries are generally successful, the specific power is limited by the relatively high internal resistance of the cell and the weight of the battery components. The beta-alumina ceramics used in sodium-sulfur batteries are relatively fragile and require high temperature metal/ceramic bonds which are compatible with liquid sodium and sulfur. In lithium-iron sulfide batteries, the liquid electrolyte impregnated with porous MgO cylinders has problems with shorting due to formation of lithium-iron-sulfur whiskers in the electrolyte. In sodium-sulfur batteries, failure of the ceramic electrolyte can cause highly exothermic sodium-sulfur reactions which can be a safety concern.

For the above and other reasons, it would be highly desirable to provide secondary storage batteries havign high specific power and energy, and high power and energy density. It would be particularly desirable if such batteries could be constructed using ion-selective barriers which are rugged, provide very low resistance to the flow of an ionizable species, and have a relatively low weight.

U.S. Pat. No. 3,014,084 describes self-continuing hydride cells having an alkali metal or alkaline-earth metal (e.g. lithium) anode and a metal (e.g. sodium) hydride in an auxiliary chamber. The sodium hydride is heated to a temperature at which hydrogen is released from the sodium hydride, and the metal anode and the electrolyte are molten. Electrolytes formed from mixtures of alkali and alkaline metal halides, particularly eutectic mixtures, are disclosed. This cell is like a fuel cell in that the reaction ceases when the supply of metal or metal hydride is substantially depleted. Moreover, the hydride cell of U.S. Pat. No. 3,014,084 can not be recharged because the lithium of the anode is in contact with the electrolyte and also because the hydrogen is dispersed into the electrolyte. U.S. Pat. No. 3,031,518 describes fuel cells, for example, of Example II having an H$_2$ electrode, a molten lithium metal anode and a eutectic mixture electrolyte heated to 450° C. This fuel cell also suffers shortcomings similar to those of the hydride cells of U.S. Pat. No. 3,014,084 in that it requires regeneration of the hydride (e.g. by thermal decomposition) to and, for the same reasons, can not be recharged).

U.S. Pat. Nos. 3,960,596 and 3,946,751 describe sodium-sulfur storage batteries which rely on the transport of sodium through a sodium ion conductive material, such as beta-alumina, to produce a current flow. The chemical potential to drive the sodium across the conductive electrolyte results from the reaction of sodium and sulfur to form sodium sulfide. U.S. Pat. No. 3,849,200 describes a similar sodium-iodine battery which relies on the reaction of sodium and iodine to form sodium iodide. U.S. Pat. No. 3,404,035 describes a storage battery operating at elevated temperature and having an alkali metal such as molten sodium, potassium or lithium, as an anodic reactant, and a metal salt, such as sodium sulfide, potassium sulfide and lithium sulfide, as the cathodic reactant. The battery employs a glass separator, typically a mixture of silicon dioxide, aluminum oxide and sodium carbonate.

According to the present invention, a battery cell has a source of hydrogen, such as H$_2$ gas or an alkali metal hydride or alkaline-earth metal hydride, as a hydrogen-providing reactant. The battery cell has an alkali-metal or alkaline-earth metal as a metal reactant. The particular reactants are chosen to favor transfer of the hydrogen from the hydrogen-providing reactant to the metal reactant under discharge conditions. By separating the reactants with a barrier selective for ionized hydrogen, a current flow of electrons through an external circuit may be developed.

The battery cell of the present invention has a number of advantages over other electrochemical cells, particularly over the sodium-sulfur and lithium-iron sulfide cells described above. First, reliance on the transport of atomic hydrogen allows a much wider selection of barrier materials. In the preferred embodiment, mixtures of alkali metal salt and/or alkaline earth metal salt electrolyte act as the selective barrier. By placing solid metal electrodes on either side of the electrolyte, one electrode acts as an anode by yielding electrons to the species being oxidized while the other electrode acts as a cathode by accepting electrons from the species being reduced. Such barriers provide very low internal resistance, greatly enhancing the power density of the cells.

A second advantage is the reduced weight of the battery cell. The use of very thin metal electrodes with an electrolyte greatly reduces the weight in comparison to batteries having ceramic barriers thus increasing the specific energy. Additional advantages include the sturdiness and reliability inherent in metal electrode construction and the relative safety of the reactants. The hydriding reaction relied on by certain of the reactants employed in the cell of the present invention is less exothermic than the sodium-sulfur reaction used by other cells of the same type.

The battery cells of the present invention may be constructed and stored for later use. The cells are activated by increasing the cell temperature sufficiently to melt the reactants and electrolytes and allow the reaction between the anodic and cathodic reactants to commence. Methods of heating cells are known to the art, for example, the *Handbook of Batteries and Fuel Cells*, McGraw-Hill, 1984. The cells could be particularly useful as a power source for electrically-driven vehicles and for transient energy storage at stationary power plants and in special space applications.

Figure 2:
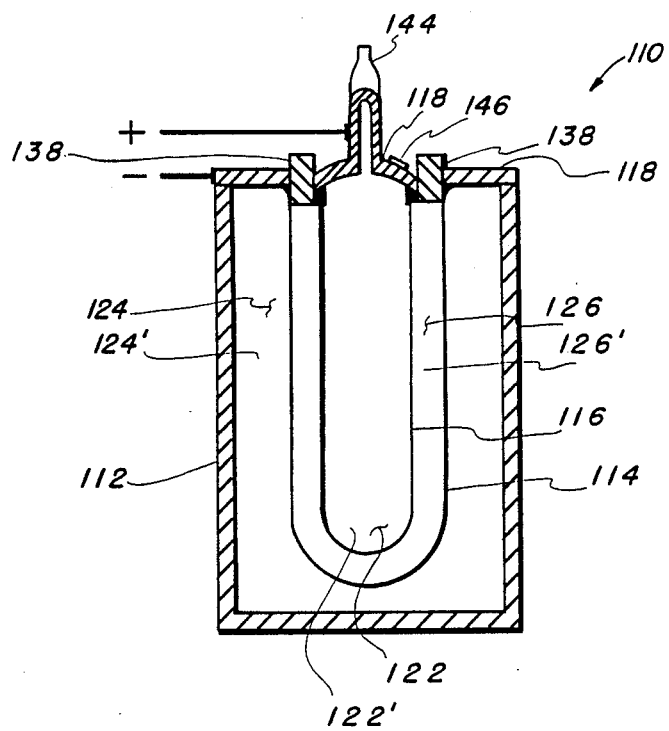

In the Drawing:

FIGS. 1 and 2 are schematic illustrations of electrochemical cells in accordance with the principles of the present invention.

Referring to FIG. 1, an electrochemical cell 10 constructed in accordance with the principles of the present invention includes a casing 12, a first electrode 14 and a second electrode 16. The casing 12 is typically a cylindrically-shaped metal vessel which is open at one end. As illustrated, the one end of casing 12 is sealed by a plate 18.

The casing 12 and plate 18 together define an interior volume 20 which is divided into three compartments by the first electrode 14 and second electrode 16. The first compartment 22 defined between the inner wall of casing 12 and the outer wall of electrode 16 holds a hydride reactant 22' which is a source of hydrogen. Similarly, a second compartment 24 is defined in the interior of electrode 14 to hold a metal reactant 24'. The annular space 26 between the first electrode 14 and second electrode 16 holds an electrolyte 26' selective for the passage of ionized hydrogen.

Current is produced by the cell 10 as hydrogen evolved from the hydride reactant 22' in compartment 22 passes through the electrode 16 and becomes ionized at the interface with the electrolyte 26'. The hydrogen ion (i.e., an H⁻ ion which is negatively charged) is able to pass through the electrolyte, giving up the electron to electrode 14 at the interface with the electrolyte. The neutral hydrogen then enters compartment 24 where it reacts with the metal reactant 24'.

As illustrated, both electrodes 14 and 16 are, for example, metal bellows having pleated cylindrical walls. The pleated walls increase the surface area of the electrodes, increasing the overall diffusion of hydrogen through the electrolyte 26'.

The metal electrodes 14 and 16 are composed of a solid metal which is chemically inert with hydrogen and which allows relatively fast hydrogen permeation, and are sometimes referred to as membranes. They are not porous. Suitable metals include nickel, palladium, vanadium, zirconium, niobium and the like. The total surface area of each electrode may vary widely, depending upon the desired amount of current generation. The areas may vary from several $cm^2$ to several $m^2$. An electrode should be as thin as possible consistent with structural integrity and the ability to conduct the expected current densities. Such thin electrodes provide minimum resistance to hydrogen diffusion. These electrodes keep the electrolyte from being in direct physical contact with either reactant.

Although the preferred embodiment of FIG. 1 includes a pair of concentric, cylindrical electrodes, it will be appreciated that other geometries such as parallel, flat plates would also be suitable. Suitable modification of the casing 12 and remaining components of the cell 10 to accommodate such flat electrodes would be obvious to one skilled in the art and need not be described further.

The electrolyte 26' is provided to selectively pass hydrogen ions (and inhibit the passage of electrons and non-ionized hydrogen) between the electrodes 14 and 16. Suitable electrolytes include alkali metal halides, alkaline earth metal halides, alkali metal salts and alkaline earth metal salts, typically mixed with a metal hydride in an amount up to 5% by weight, typically about 1% to 2%. Conveniently, the electrolyte will be maintained in a liquid state by elevating the temperature. To lower the melting point of the electrolyte, binary or ternary eutectic salt mixtures may be employed. Suitable eutectic mixtures include lithium chloride and potassium chloride, lithium iodide and potassium iodide, calcium chloride and potassium chloride, lithium bromide and potassium bromide, and the like. Suitable metal hydrides include lithium hydride and calcium hydride. Such electrolytes have been found to rapidly pass negatively-charged hydrogen ions, while suitably inhibiting the passage of uncharged hydrogen and electrons. One preferred electrolyte is a mixture of lithium chloride (about 40% by weight) and potassium chloride (about 60% by weight), to which lithium hydride (about 1–2% by weight) is added. Alternatively, a mixture of lithium iodide (about 40% by weight), potassium iodide (about 60% by weight) can be used, to which lithium hydride (about 2% by weight) is added.

The spacing of electrodes 14 and 16 and the resulting volume of electrolyte space 26 is not critical. It is necessary only that sufficient electrolyte 26' be present in order to effectively inhibit the passage of non-ionized hydrogen and electrons. Typically, a spacing between electrodes 14 and 16 is in the range from about 1 mm to 5 mm, more typically being about 2 mm. Keeping the electrolyte layer thin tends to lower resistance to hydrogen diffusion thereby lowering the internal resistance of the cell.

The first electrode 14 is suspended in the cell by a cap member 28 and sealed at its other end by end plate 30. Similarly, the second electrode 16 is suspended from a flange element 32 and sealed by end plate 34. Both the cap member 28 and the flange element 32 are electrically conductive to provide a path for the flow of electrons between the respective electrodes and a circuit 40 outside of casing 12. A terminal element 36 is connected to the cap member 28 to allow for external connection of the cell 10. The terminal 36 is electrically isolated from the remainder of plate 18 and the cell casing 12 by an isolation ring 38, typically constructed of a ceramic such as aluminum oxide ($Al_2O_3$). The ceramic ring 38 may be attached to plate 18 by conventional metal/ceramic brazing. An external circuit 40 may thus be connected between the terminal 36, which acts as the anodic (negatively poled) connection, and any remaining portion of the metal casing 12 or plate 18, which acts as the cathodic (positively poled) connection. Electron flow will thus be from terminal 36 to plate 18 during discharge of the cell 10 (with conventional current flow in the opposite direction). For recharging, a direct current source of suitable voltage, typically in the range from about 0.5 to 1.0 volts, will be connected with the positive terminal of the source connected to plate 18 and the negative terminal of the the source connected to terminal 36 of the cell, so that current flows in the opposite direction from that during discharge of the cell.

Usually, a tube 42 will be provided through the casing 12 or the plate 18 to allow for purging of the interior of the cell with an inert gas, such as argon. The tube 42 also allows for leak testing of the cell prior to charging. The cell is completely sealed in order to avoid hydrogen leakage which would reduce cell performance.

Because of the nature of the cell reactants and electrolytes, the cell does not operate at normal room temperatures. Both the reactants and the electrolytes are solids at room temperature, and need to be melted in order to allow sufficient hydrogen flow in order to induce current flow. Usually, the electrolyte will have a higher melting point and determine the operating temperature range, for example, 250° C. to 500° C. The temperature must exceed the melting point of lithium (about 181° C.). The temperature need not be increased to the point where hydrogen is driven from the metal hydride by heat. For alkali metal chlorides and alkaline earth metal chlorides, the operating temperature will typically be in the range from about 350° to 450° C., while for alkali metal iodides, as well as alkaline earth metal iodides, the operating range will be somewhat lower, typically in the range from less than 250° to about 350° C. The electrolyte mixtures are selected to lower the melting point to allow lower temperature operation of the cell.

Suitable hydrogen-providing reactants include hydrogen gas, and alkali metal hydrides and alkaline earth metal hydrides, such as lithium hydride, sodium hydride, potassium hydride, rubidium hydride, cesium hydride, magnesium hydride, calcium hydride, strontium hydride, and barium hydride. A small amount of the metal is preferred to be added to the metal hydride reactant. Suitable metal reactants include alkali metal and alkaline earth metals, such as lithium, sodium, potassium, rubidium, cesium, magnesium, calcium, strontium and barium. A small amount of the hydride of the metal is preferred to be added to the metal reactant. For a particular battery, the metal hydride and metal must be selected such that the thermodynamic and kinetic considerations favor the transfer of hydrogen from the hydride or $H_2$ gas to the metal. Lower molecular weight reactants are preferred since they increase the specific energy. A preferred system is sodium hydride with about 1-2% sodium metal as the hydrogen-providing reactant and lithium metal with about 1-2% lithium hydride as the metal reactant. The reactants are stated for the cell in the charged state.

As the battery cell is discharged, the sodium hydride reactant gives up hydrogen and becomes sodium metal and the lithium metal reactant accepts hydrogen and becomes lithium hydride. Hydrogen from the hydride material passes through the electrolyte to combine with the metal material. The overall reaction is:

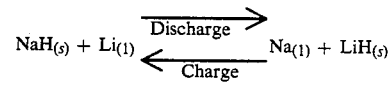

where:
(s) indicates solid, and
(l) indicates liquid.

The battery cell is recharged by reversing the electrochemical reaction. There is no need to add additional reactants or to replace expended reactants to recharge the cell, as is the case with fuel cells.

Elements of the cell 110 of FIG. 2 which correspond to those of cell 10 in FIG. 1 are identified by like numbers, but in the 100 series. Within casing 112, hydrogen permeable electrodes 114 and 116 divide the interior volume of casing 112 into a first compartment 122 holding hydrogen-providing reactant 122', a second anodic compartment 124 holding metal reactant 124', and an electrolyte space 126 holding electrolyte 126'. Electrodes 114 and 166 are affixed at opposite surfaces of isolation ring 138, and are electrically connected to the outer and center portions of cap member 118 for providing anode (−) and cathode (+) connections, respectively.

Electrolyte 126' and metal reactant 124' are as described in connection with FIG. 1. Reactant 122' is hydrogen gas which is loaded into compartment 122 via inlet port 144. Inlet port 144, which serves as a convenient fluid passage for evacuating and purging compartment 122, is sealed when compartment 122 is filled with $H_2$ gas. The pressure within compartment 122 decreases as the cell is discharged and increases due to the hydrogen generated when the cell is charged. Pressure sensor 146 may be affixed to the dome-shaped center portion of cap member 118 to provide an indication of the state of charge of the cell.

As the cell 110 is discharged, hydrogen from the compartment 122 combines with the lithium metal reactant 124' to form lithium hydride. The overall reaction is:

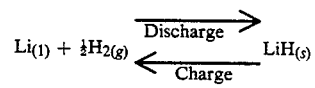

where (l) indicates liquid,
(g) indicates gas, and
(s) indicates solid.

As above, the battery cell is recharged by reversing the reaction.

Electrical connections can be made at convenient locations on cell 110, for example, a negative terminal can be on port 144 which is a conductive metal, such as stainless steel.

Although the foregoing invention has been described in some detail by way of illustration and example for purposes of clarity of understanding, it will be obvious that certain changes and modifications may be practiced within the scope of the appended claims. For example, other cell shapes such as a flat-plate construction can be employed. Flat-plate cells can be physically stacked and electrically connected in parallel to increase the current that can be produced.

In addition, battery cells can be constructed with either the hydrogen-providing reactant compartment or the metal-reactant compartment closest to the case, as FIGS. 1 and 2 illustrate, thereby having a positively or negatively poled case.

What is claimed is:

1. A battery cell comprising:
   a casing;
   a barrier dividing the casing into two compartments, said barrier being capable of selectively passing ionized hydrogen;
   a source of hydrogen in one compartment;
   a metal capable of forming a metal hydride in the other compartment; and
   means for connecting an external circuit across the barrier.

2. A cell as in claim 1, wherein said source of hydrogen includes a metal hydride.

3. A cell as in claim 2, wherein said metal hydride is selected from the group consisting of LiH, NaH, KH, RbH, CsH, $MgH_2$, $CaH_2$, $SrH_2$, and $BaH_2$.

4. A cell as in claim 3, wherein said metal is selected from the group consisting of Li, Na, K, Rb, Cs, Mg, Ca, Sr, and Ba.

5. A cell as in claim 1, wherein the means for connecting an external circuit across the barrier includes a first terminal electrically connected to one side of the barrier and a second terminal electrically connected to the other side of the barrier.

6. A cell as in claim 1, wherein said source of hydrogen includes $H_2$ gas.

7. A cell as in claim 1, wherein said metal is selected from the group consisting of Li, Na, K, Rb, Cs, Mg, Ca, Sr, and Ba.

8. A cell as in claim 1, wherein said barrier includes an electrolyte selected from the group consisting of alkali metal halides, alkaline earth metal halides, alkali metal hydrides, and alkaline earth metal hydrides, and mixtures thereof.

9. A cell as in claim 8, wherein the electrolyte is a eutectic mixture selected from the group consisting of LiCl and KCl, LiI and KI, $CaCl_2$ and KCl, LiBr and KBr, and LiH, and $CaH_2$, and mixtures thereof.

10. A cell comprising:
    a casing;
    a pair of spaced-apart solid electrodes having an electrolyte therebetween chosen to selectively pass ionized hydrogen atoms, said electrodes defining two isolated compartments within the casing;
    a reactant selected from the group consisting of hydrogen gas and an alkali metal hydride or alkaline earth metal hydride in one of the compartments;
    an alkali metal or alkaline earth metal capable of forming a metal hydride in the other of the compartments;
    a first terminal electrically connected to one of said electrodes; and
    a second terminal electrically connected to the other of said electrodes.

11. A cell as in claim 10, wherein the electrodes are composed of a solid metal selected from the group consisting of nickel, palladium, vanadium, zirconium, and niobium.

12. A cell as in claim 10, wherein the electrolyte is selected from the group consisting of alkali metal halides, alkaline earth metal halides, alkali metal hydrides, and alkaline earth metal hydrides, and mixtures thereof.

13. A cell as in claim 12, wherein the electrolyte is a eutectic mixture selected from the group consisting of LiCl and KCl, LiI and KI, $CaCl_2$ and KCl, LiBr and KBr, and LiH, and $CaH_2$, and mixtures thereof.

14. A cell as in claim 10, wherein the metal hydride is selected from the group consisting of LiH, NaH, KH, RdH, CsH, $MgH_2$, $CaH_2$, $SrH_2$, and $BaH_2$.

15. A cell as in claim 10, wherein the metal is selected from the group consisting of Li, Na, K, Rd, Cs, Mg, Ca, Sr, and Ba.

16. An improved battery cell of the type wherein a first reactant and a second reactant are separated by a barrier capable of passing a reacting species only when said species is ionized, wherein current is produced by said species losing electrons on one side of said barrier and gaining electrons on the other side of said barrier, said improvement comprising use of a metal and a metal hydride as said reactants and hydrogen as said reacting species, and of a pair of spaced-apart solid electrodes included in said barrier.

17. An improved cell as in claim 16, wherein the metal is selected from the group consisting of Li, Na, K, Rb, Cs, Mg, Ca, Sr, and Ba.

18. An improved cell as in claim 16, wherein the metal hydride is selected from the group consisting of LiH, NaH, KH, RbH, CsH, $MgH_2$, $CaH_2$, $SrH_2$, and $BaH_2$.

19. The improved cell as in claim 16, wherein said hydrogen is provided by a metal capable of forming a metal hydride.

20. A method for producing electricity, said method comprising heating the cell of claim 1 to a temperature in the range from less than 250° to about 450° C. to melt the metal hydride and allow passage of hydrogen across the barrier.

21. A battery cell comprising:
    a casing;
    a barrier dividing the casing into two compartments, said barrier being capable of selectively passing ionized hydrogen;
    a metal hydride in one compartment;
    a metal capable of forming a metal hydride in the other compartment; and
    means for connecting an external circuit across the barrier.

22. A cell as in claim 21, wherein said metal hydride is selected from the group consisting of LiH, NaH, KH, RbH, CsH, $MgH_2$, $CaH_2$, $SrH_2$, and $BaH_2$.

23. A cell as in 21 claim 3, wherein said metal is selected from the group consisting of Li, Na, K, Rb, Cs, Mg, Ca, Sr, and Ba.

24. A cell as in claim 21, wherein the means for connecting an external circuit across the barrier includes a first terminal electrically connected to one side of the barrier and a secnd terminal electrically connected to the other side of the barrier.

25. A cell as in claim 21, wherein said barrier includes an electrolyte selected from the group consisting of alkali metal halides, alkaline earth metal halides, alkali metal hydrides, and alkaline earth metal hydrides, and mixtures thereof.

26. A cell as in claim 25, wherein the electrolyte is a eutectic mixture selected from the group consisting of LiCl and KCl, LiI and KI, $CaCl_2$ and $CaH_2$, and LiH, and $CaH_2$, and mixtures thereof.

27. A cell as in claim 21, wherein said barrier includes a solid electrode composed of a solid metal selected from the group consisting of nickel, palladium, vanadium, zirconium, and niobium.

* * * * *